United States Patent
Orr et al.

(10) Patent No.: US 6,722,987 B2
(45) Date of Patent: Apr. 20, 2004

(54) PROCESSING COLLISIONS BETWEEN DIGITALLY REPRESENTED MOBILE OBJECTS AND FREE FORM DYNAMICALLY CREATED ELECTRONIC INK

(75) Inventors: Lachlan J. Orr, Seattle, WA (US); Eric B. Fox, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 119 days.

(21) Appl. No.: 10/123,349

(22) Filed: Apr. 16, 2002

(65) Prior Publication Data

US 2003/0195039 A1 Oct. 16, 2003

(51) Int. Cl.[7] .......................... A63F 13/00; G06T 15/70
(52) U.S. Cl. ............................ 463/31; 463/9; 345/419; 345/473
(58) Field of Search .................. 463/31, 32, 33, 463/30, 3, 9, 1; 345/418, 419, 473, 474, 442

(56) References Cited

PUBLICATIONS

Freudenberg, Bert et al., Walk–Through Illustrations: Frame–Coherent Pen–and–Ink Style in a Game Engine, Eurographics 2001, 2001, C–184–C–191, vol. 2, No. 3, Blackwell Publishers, England.

Derose, Tony et al., Subdivision Surfaces in Character Animation, Computer Graphics Annual Conference, 1998, 85–94, ACM Publishers, New York.

Simeon, T. et al., Towards a software development kit for motion synthesis in virtual worlds, Seventh International Conference on Virtual Systems and Multimedia, Oct. 25–27, 2001, 854–863, IEEE Computer Society, Los Alamitos, California.

Policarpo, Fabio et al., Real–Time Collision Detection and Response, XIV Brazilian Symposium on Computer Graphics and Image Processing, Oct. 15–18, 2001, 376, IEEE Computer Society, Los Alamitos, California.

*Primary Examiner*—Jessica Harrison
(74) *Attorney, Agent, or Firm*—Banner & Witcoff, Ltd.

(57) ABSTRACT

A computer user enters free-form electronic ink at run-time of an application program for manipulating the trajectories of mobile objects within the application program. Collisions between mobile objects and ink are processed by determining a collision angle that bisects a first and last intersecting point along a periphery of the first object. After the collision, the first object moves away from the ink as if the first object collided with a flat surface oriented perpendicular to the collision angle.

27 Claims, 14 Drawing Sheets

PROCESSING COLLISIONS BETWEEN DIGITALLY REPRESENTED MOBILE OBJECTS AND FREE FORM DYNAMICALLY CREATED ELECTRONIC INK

FIELD OF THE INVENTION

The invention relates to allowing a computer user to use free form dynamically created electronic ink to interact with digitally represented mobile objects and relates to various techniques for processing collisions between the mobile objects and the ink.

BACKGROUND OF THE INVENTION

Computer application programs, such as computer games, screen savers, and the like, may have objects that move around the display screen and interact with other objects within the application program. Computer games in which a ball or other similar moving object moves around and bounces off of walls, paddles, and the like are well known in the art. JezzBall is an example of such a game. FIGS. 1–4 are Jezzball screen shots. JezzBall begins by displaying a game board 100 of tiles 102. The game board initially represents a large area in which balls 104-1 and 104-2 bounce around off of each other and off of the walls 106-1 through 106-4. The two balls 104 move around the screen bouncing off each other and off of the walls 106 according to expected physics principles, such as that the angle of incidence of a collision between a ball and a wall will equal the angle of reflection of the ball as it leaves the wall after the collision. The object of the game is to trap the balls into progressively smaller areas by building horizontal and vertical walls. A person playing JezzBall builds a wall by positioning the cursor and clicking a mouse button. JezzBall builds walls from a central point in opposite vertical or horizontal directions. FIG. 2 shows a vertical wall being built in two wall sections 200-1 and 200-2. FIG. 3 shows a completed version of the wall 300, which was shown being built in FIG. 2.

FIG. 4 shows the balls 104 confined to small areas 400-1 and 400-2. A user interface element 402 indicates the percentage of the game board 100 that has been cleared. Once 75 percent of the game board has been cleared, the player advances to the next game board, which will have more balls than the previous game board.

Relative to the conventional keyboard and mouse input devices, computer systems are providing more natural ways for users to interact with their computers. One of these more natural ways is handwritten electronic ink. Accordingly, an application program, such as a computer game, that allows a user to interact naturally, via electronic ink, with mobile objects, such as bouncing balls and the like, within the game would be desirable.

Such a game, however, presents technical challenges regarding processing collisions between the mobile objects and free form electronic ink. Free form electronic ink refers to ink that may be entered by a user and that is not limited to predefined shapes and/or predefined orientations. The technical challenges are presented by the many orientations that the ink may have at locations at which a mobile object collides with the ink.

In contrast, conventional application programs, typically process collisions between mobile objects and a limited number of predefined shapes in predefined orientations. For instance, FIG. 5 depicts velocity vectors 504 and 506 of a conventional application program's mobile object 500 (e.g., a ball) before and after, respectively, a collision with a flat horizontal surface 514 (e.g., a wall). The angle 516 of velocity vector 504 relative to the velocity vector's vertical or y-coordinate component 502, before the collision, is equal to the angle 518 of velocity vector 506 after the collision. The mobile object's velocity vector may be changed from 504, before the collision, to 506, after the collision, by negating the y component 502 of the mobile object's velocity vector 504. The mobile object's post-collision velocity vector 506, will then have an x component, 512 that is the same as the x component value 510 of pre-collision velocity vector 504, but a y component value 508 that is the inverse of the pre-collision y-component vector 502. Techniques for processing other types collisions, such as collisions with flat vertical surfaces, and collisions with circular shapes are also well known in the art.

Processing collisions between an application program's mobile objects and free form electronic ink is more complicated than processing collisions for which the shapes and orientations are known at development time of the application program. Accordingly, relatively simple and efficient techniques for processing collisions between an application program's mobile object and free form electronic ink would be desirable.

BRIEF SUMMARY OF THE INVENTION

In accordance with the invention, a collision between a digitally represented mobile object and free form electronic ink is processed simply and efficiently. A collision angle is determined. The collision angle may bisect a first and last intersecting point along a periphery of the mobile object. The mobile object's trajectory is then changed is such that the mobile object moves away from the ink as if the mobile object had collided with a flat surface that is oriented perpendicular to the collision angle.

The mobile object's trajectory may be changed as a result of the collision by: rotating the mobile object's velocity vector in a first direction by an amount that would make the collision surface orientation vertical; negating an x component value of the mobile object's velocity vector; and rotating the mobile object's velocity vector in a direction opposite to the first direction by the amount that would make the collision orientation vertical. Alternatively, the mobile object's velocity vector could be rotated in a first direction by an amount that would make the collision surface orientation horizontal; a y component of the mobile object's velocity vector could then be negated; and the mobile object's velocity vector could then be rotated in a direction opposite to the first direction by the amount that would make the collision orientation horizontal.

A computer system, in accordance with the invention, includes an application program that uses an ink API. The ink API provides services for capturing, storing, and displaying ink entered by a user. The computer system includes: an input device for entering free form handwritten electronic ink, and an ink-based computer application program that includes a collision processing module. The collision processing module requests information from the ink API about whether free form ink, entered by a user at run time of the application program, exists at locations occupied by one or more selected mobile application-program objects. And the collision processing module causes a change to a trajectory of at least one of the selected mobile application-program objects, based on how the locations of the mobile application-program objects overlap with the free form ink.

An ink-based computer game, in accordance with the invention, provides a natural way, via handwritten electronic ink, for players of the game to interact with mobile objects within the game. The game may include colored balls; game boards; and free form handwritten electronic ink entered by a user while playing the game, wherein the balls bounce off of other balls, wall tiles, and the electronic ink and go through drainpipes in the game board.

DETAILED DESCRIPTION OF THE INVENTION

General Purpose Computing Environments

Figure 6:
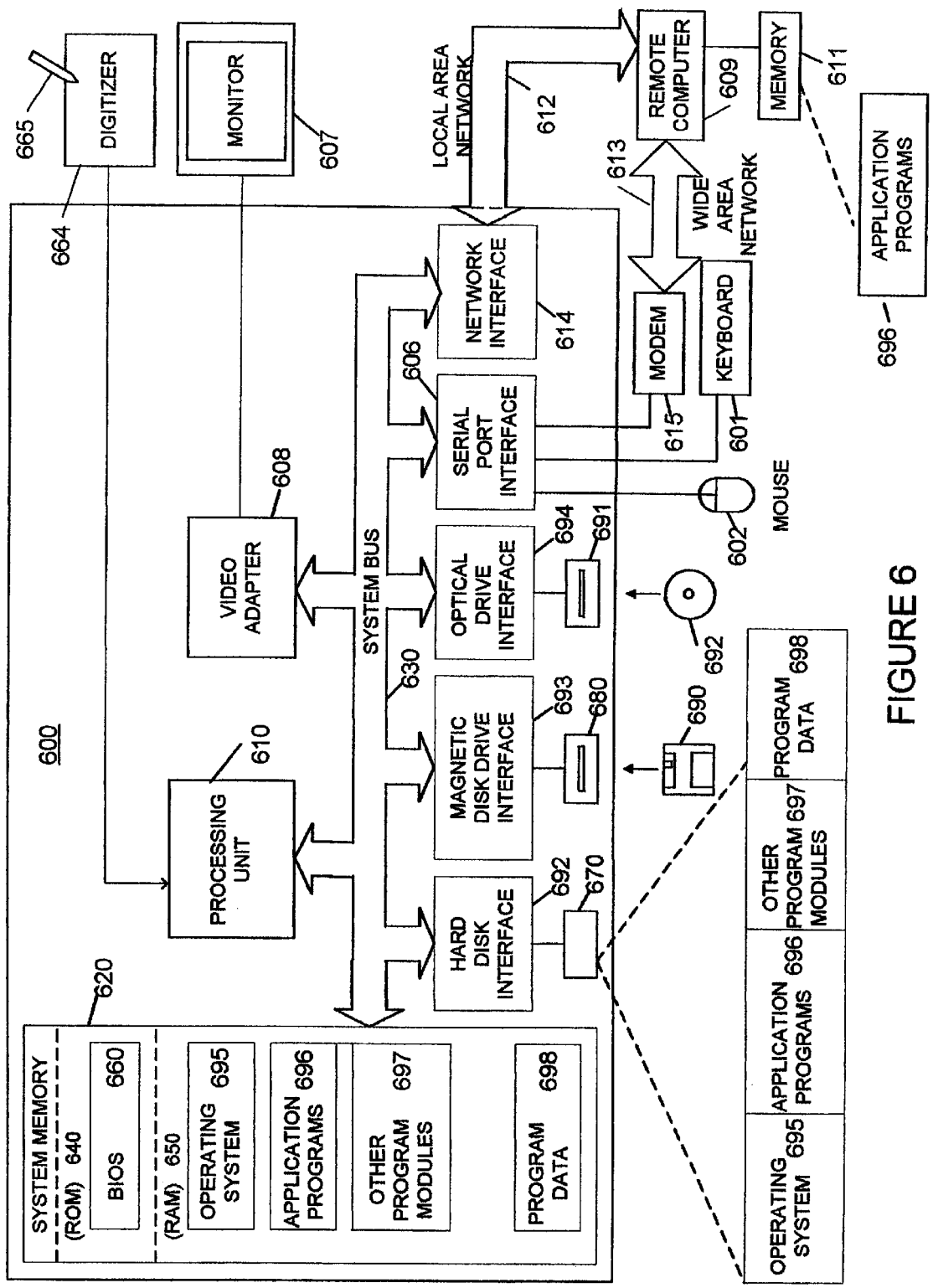
FIG. 6 is a schematic diagram of an exemplary operating environment, in the form of a general purpose computer, in which various aspects of the invention can be implemented.

Although not required, the invention will be described in the general context of computer-executable instructions, such as program modules. Generally, program modules include routines, programs, objects, scripts, components, data structures, and the like that perform particular tasks or implement particular abstract data types. The invention provides for a software system that may be implemented on any network infrastructure such that networked devices may be remotely controlled by, for example, a general-purpose computer, or a system whereby the networked devices may share information with and about each other. The invention provides and accepts common command, control, and communication through the network while retaining the ability of each device to operate autonomously. In a distributed computing environment, program modules may be located in both local and remote memory storage devices FIG. 6 illustrates a schematic diagram of an exemplary conventional general-purpose digital computing environment that can be used to implement various aspects of the invention. In FIG. 6, a computer 600 includes a processing unit 610, a system memory 620, and a system bus 630 that couples various system components including the system memory to the processing unit 610. The system bus 630 may be any of several types of bus structures including a memory bus or memory controller, a peripheral bus, and a local bus using any of a variety of bus architectures. The system memory 620 includes read only memory (ROM) 640 and random access memory (RAM) 650.

A basic input/output system 660 (BIOS), containing the basic routines that help to transfer information between elements within the computer 600, such as during startup, is stored in the ROM 640. The computer 600 also includes a hard disk drive 670 for reading from and writing to a hard disk (not shown), a magnetic disk drive 680 for reading from or writing to a removable magnetic disk 690, and an optical disk drive 691 for reading from or writing to a removable optical disk 692 such as a CD ROM or other optical media. The hard disk drive 670, magnetic disk drive 680, and optical disk drive 691 are connected to the system bus 630 by a hard disk drive interface 692, a magnetic disk drive interface 693, and an optical disk drive interface 694, respectively. The drives and their associated computer-readable media provide nonvolatile storage of computer readable instructions, data structures, program modules and other data for the personal computer 600. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 670, magnetic disk 690, optical disk 692, ROM 640 or RAM 650, including an operating system 695, one or more application programs 696, other program modules 697, and program data 698. A user can enter commands and information into the computer 600 through input devices such as a keyboard 601 and pointing device 602. Other input devices (not shown) may include a microphone, joystick, game pad, satellite dish, scanner or the like. These and other input devices are often connected to the processing unit 610 through a serial port interface 606 that is coupled to the system bus, but may be connected by other interfaces, such as a parallel port, game port or a universal serial bus (USB). Further still, these devices may be coupled directly to the system bus 630 via an appropriate interface (not shown). A monitor 607 or other type of display device is also connected to the system bus 630 via an interface, such as a video adapter 608. In addition to the monitor, personal computers typically include other peripheral output devices (not shown), such as speakers and printers. In a preferred embodiment, a pen digitizer 664 and accompanying pen or stylus 665 are provided in order to digitally capture freehand input. Although a direct connection between the pen digitizer 664 and the processing unit 610 is shown, in practice, the pen digitizer 664 may be coupled to the processing unit 610 via a serial port, parallel port or other interface and the system bus 630 as known in the art. Furthermore, although the digitizer 665 is shown apart from the monitor 607, the usable input area of the digitizer 664 may be co-extensive with the display area of the monitor 607. Further still, the digitizer 664 may be integrated in the monitor 607, or may exist as a separate device overlaying or otherwise appended to the monitor 607.

The computer 600 can operate in a networked environment using logical connections to one or more remote computers, such as a remote computer 609. The remote computer 609 can be a server, a router, a network PC, a peer device or other common network node, and typically includes many or all of the elements described above relative to the computer 600, although only a memory storage device 611 has been illustrated in FIG. 6. The logical connections depicted in FIG. 6 include a local area network (LAN) 612 and a wide area network (WAN) 613. Such networking environments are commonplace in offices, enterprise-wide computer networks, intranets and the Internet.

When used in a LAN networking environment, the computer 600 is connected to the local network 612 through a network interface or adapter 614. When used in a WAN networking environment, the personal computer 600 typically includes a modem 615 or other means for establishing a communications over the wide area network 613, such as the Internet. The modem 615, which may be internal or external, is connected to the system bus 630 via the serial port interface 606. In a networked environment, program modules depicted relative to the personal computer 600, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 7:
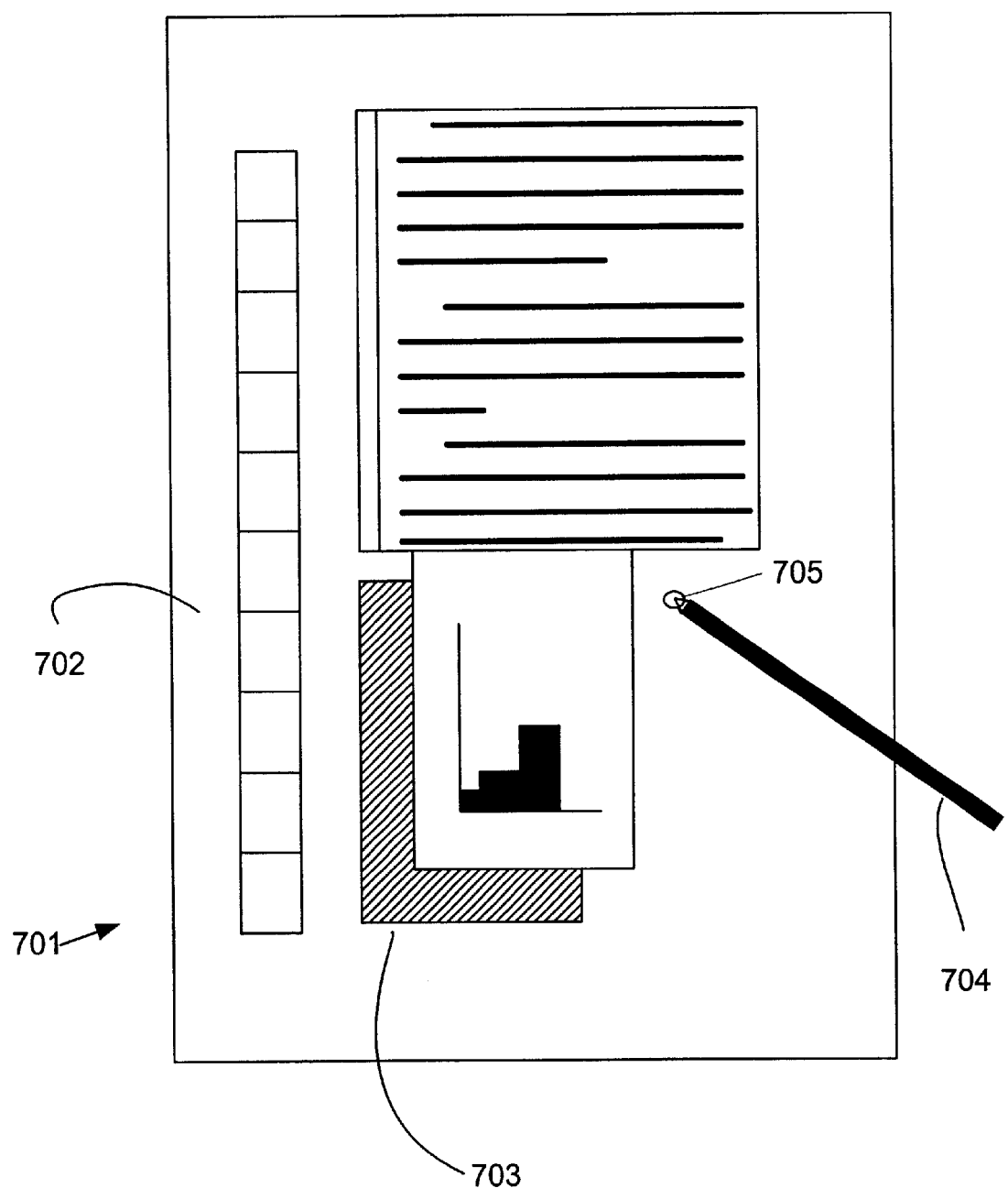
FIG. 7 is a schematic diagram of an exemplary operating environment, in the form of a tablet-and-stylus computer, in which various aspects of the invention can be implemented.
Figure 8:
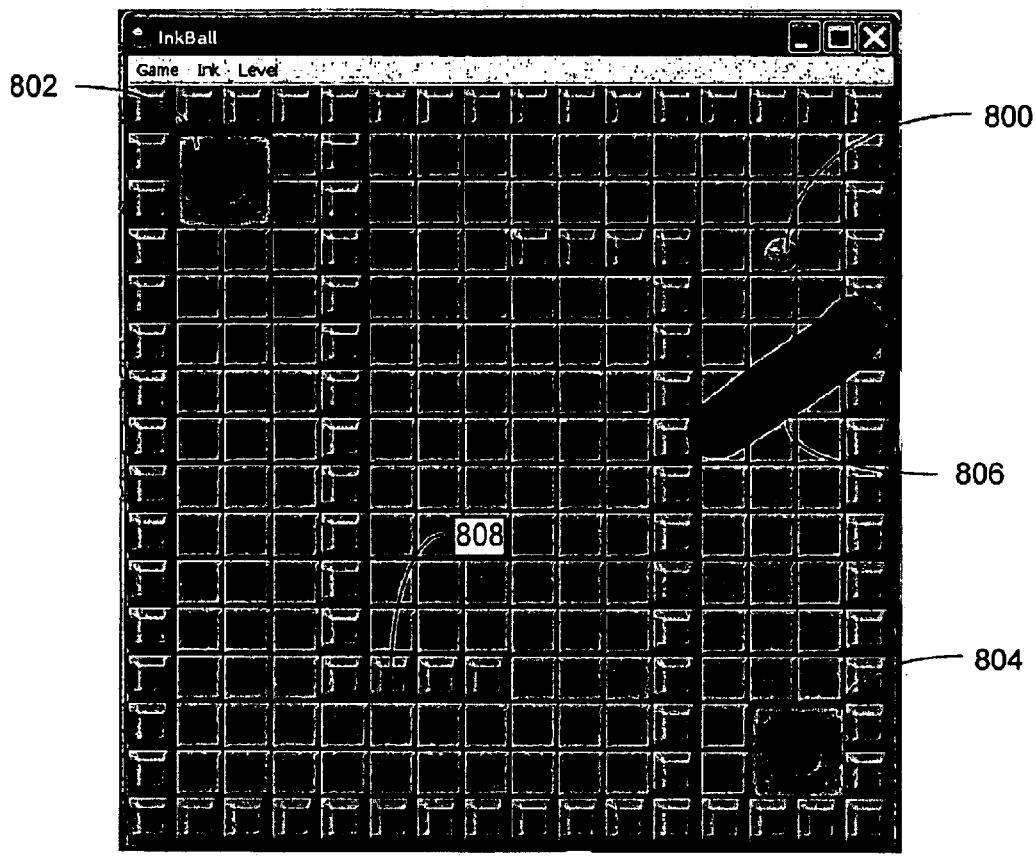
FIGS. 8–11 show an exemplary computer-game layout in accordance with the invention.
Figure 9:
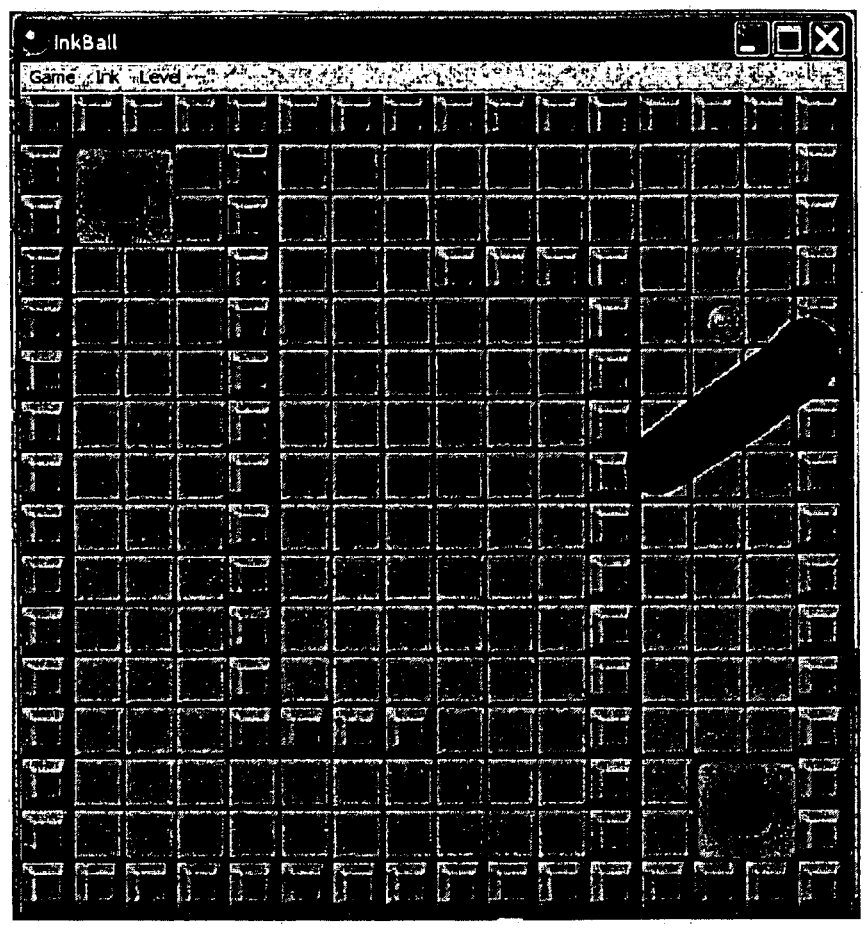

FIG. 7 illustrates an exemplary tablet-and-stylus computer 701 that can be used in accordance with various aspects of the invention. Any or all of the features, subsystems, and functions in the system of FIG. 6 can be included in the computer of FIG. 7. Tablet-and-stylus computer 701 includes a large display surface 702, e.g., a digitizing flat panel display, preferably, a liquid crystal display (LCD) screen, on which a plurality of windows 703 is displayed. Using stylus 704, a user can select, highlight, and/or write on the digitizing display surface 702. Examples of suitable digitizing display surfaces 702 include electromagnetic pen digitizers, such as Mutoh or Wacom pen digitizers. Other types of pen digitizers, e.g., optical digitizers, may also be used. Tablet-and-stylus computer 701 interprets gestures made using the stylus 704 in order to manipulate data, enter text, create drawings, and/or execute conventional computer application tasks such as spreadsheets, word processing programs, and the like.

The stylus 704 may be equipped with one or more buttons or other features to augment its selection capabilities. The stylus 704 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 704 and used for selecting or indicating portions of the displayed image on a touch-sensitive or proximity-sensitive display. Consequently, the term "user input device", as used herein, is intended to have a broad definition and encompasses many variations on well-known input devices such as stylus 704. Region 705 shows a feedback region or contact region permitting the user to determine where the stylus 704 has contacted the display surface 702.

Ink or electronic ink as used in this document refers to a sequence or a set of strokes that may have various properties. The sequence of strokes may include strokes ordered, for example, by the time captured. Each stroke is typically comprised of a sequence of points, which may be represented using a variety of known techniques including Cartesian coordinates (X, Y), polar coordinates (r, Θ), and other techniques as known in the art.

A stroke as used in this document refers to a sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. A stroke may consist of the sequence or set of points captured from when a user performs a pen down action to when the user performs a pen up action.

In various embodiments, the system provides an ink platform or API as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation.

Exemplary Application Program

FIGS. 8–11 are screen shots from an exemplary application program in the form of a computer game in which various aspects of the invention can be implemented. In the exemplary game, balls, such as ball 800, bounce off of other balls, walls 808, and ink 806 entered by the user. When a ball 800 bounces off of ink 806 the ink may disappear. The object of the exemplary game is to get colored balls, to go into like-colored drainpipes, such as drainpipe 802. When a colored ball 800 goes into a like-colored drainpipe, the user scores points. But when a colored ball 800 goes into a drainpipe 804 having a color other than the color of the ball 800, the user loses a "life" within the game. At various times during the game, a player may have one or more lives within the context of the game.

To play the game, a user, also referred to as a player of the game, enters free form electronic ink 806 onto the computer's display screen much like a traditional pen lays down liquid ink on paper. The electronic ink 806 is not limited to pre-defined shapes in orientations that are known at development time of the application program. The shape of the electronic ink is determined based on the free form ink input by the player while playing the game.

Figure 10:
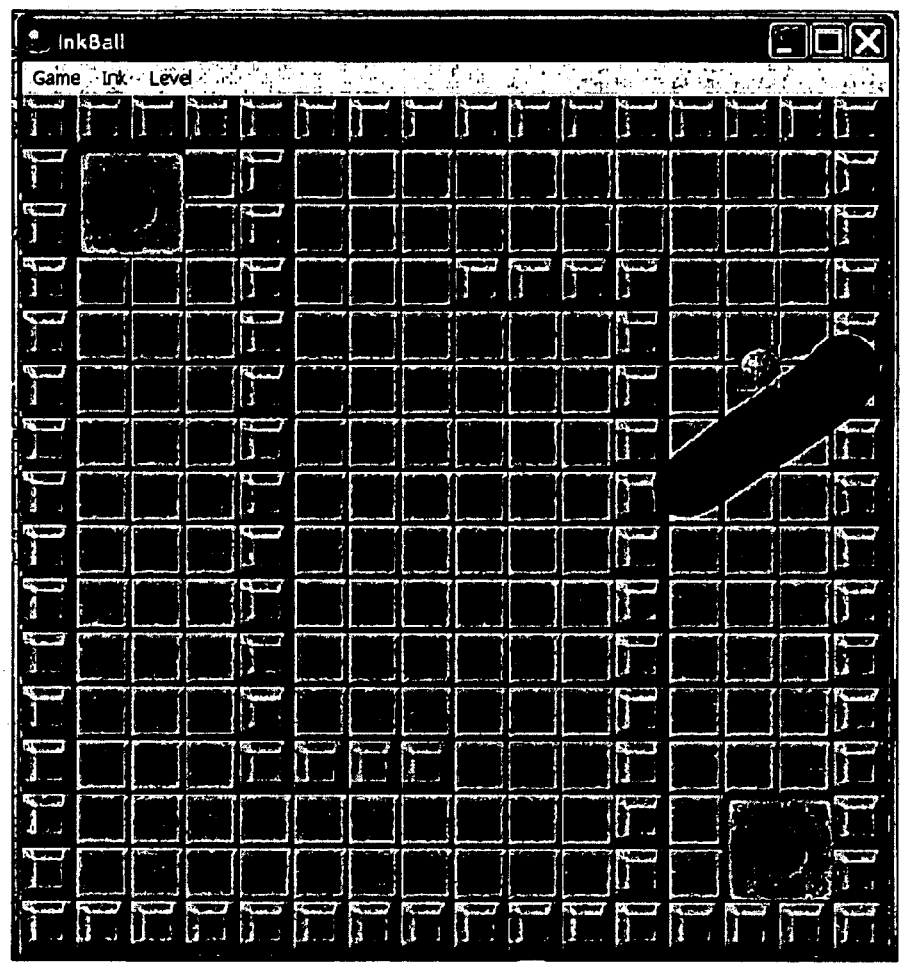
Figure 11:
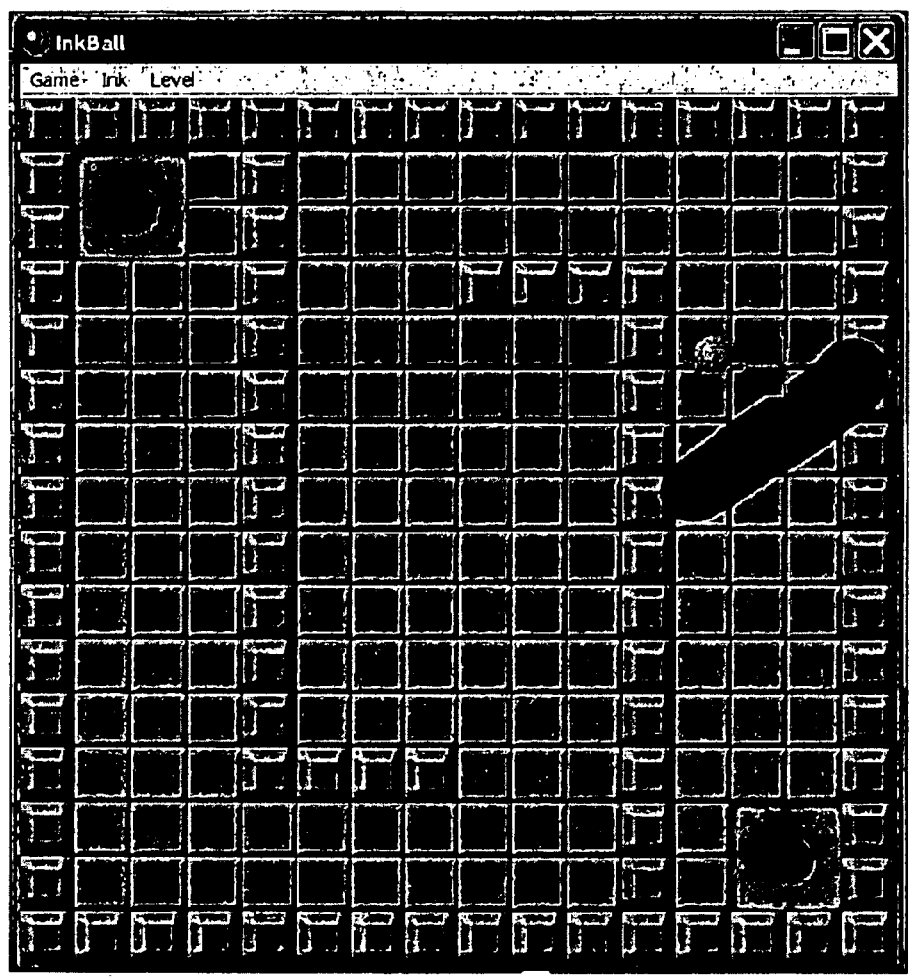

The screen shots of FIGS. 8–11 are like snap shots that progress through time. The screen shots are separated by approximately 100 milliseconds. As can be seen from the figures, the ball moves towards the ink line in FIGS. 8 and 9. In FIG. 10, the ball hits the ink. In the FIG. 11, the ball has reflected away from the ink. The ball's collision with the ink changed the direction of travel, also referred to as the ball's trajectory. The angle of incidence of this collision equals the collision's angle of reflection.

A game board is a layout of tiles that can be a wall tile, a floor tile, or a drainpipe. In this exemplary game, the balls can move freely over floor tiles and can deflect off of wall tiles. Any number of balls can be launched from a predefined spot on the board. Balls can also start on the board or off the board. There can be many different boards, grouped into multiple difficulty levels. The game may include user interface elements, such as the score and how much time is left to complete a game board.

Various objects within the game may have various properties. For example, when a ball collides with a colored wall, the ball may take on the wall's color. Colored balls may break down similarly colored breakable walls. Color filter walls may let only balls of a certain color through.

A breakthrough or breakaway wall may disappear when a ball hits the breakthrough wall. Breakaway walls can release a different kind of wall or floor tile behind the breakaway wall, such as a speed up floor.

Door walls may oscillate between being floor tiles and wall tiles. Sticky walls may stop or slow down a ball. One-way floor tiles may allow balls to pass in only one direction. One side of the one-way floor tile could act as a wall when a ball hits that side from the outside of the tile.

Transport tiles may teleport a ball to another spot on the board. Sticky floor or wall tiles may cause a ball to be stuck to the floor or wall until another ball hits the ball that is stuck. A ball launcher where balls materialize and that launches balls can be placed anywhere on the game board. Game board tiles that are drainpipes take the ball off the game board.

Balls may change color when they hit ink. Colored ink may change the color of balls that hit the colored ink. Translucent ink may be used that slows down or speeds up a ball that hits the translucent ink.

Those skilled in the art will appreciate that the above examples are merely illustrative and that other variations of the board, walls, balls, and colors may be utilized.

Figure 12:
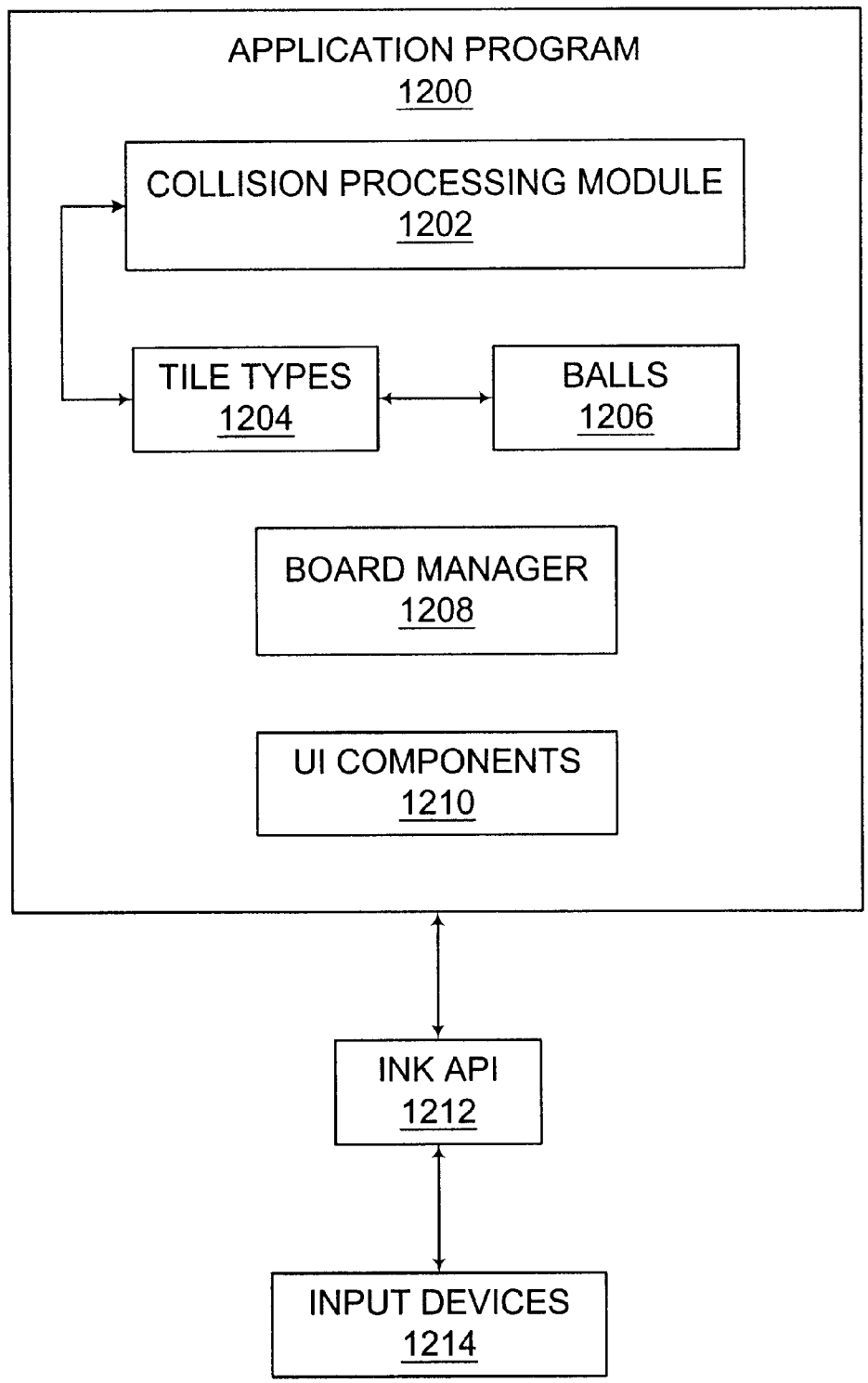
FIG. 12 is a schematic diagram of components of a system in accordance with the invention.

Referring to FIG. 12, an application program 1200, such as the exemplary game of FIGS. 8–11, uses an ink API 1212 to capture, store, retrieve information about, and display ink, which has been entered by a user through input devices 1214. As described above, the input devices 1214 could be a stylus, a mouse, or any device that emulates a mouse or allows control of a cursor on a computer's display screen. The application program 1200 gives permission to the ink API 1212 to display ink on the application program's video memory.

The application program 1200 takes advantage of the ink API's knowledge of ink strokes. The application program 1200 knows where the mobile objects are located and asks the ink API 1212 whether any ink is located where the mobile objects are located. If ink and a mobile object occupy the same location, then the mobile object has collided with ink. The application program 1200 may then change the mobile object's trajectory based on the collision. The application program can also ask the ink API 1212 to make the collided with stroke disappear.

Once such an intersection between a mobile object and ink is detected, the application program 1200 may perform a more complicated search to figure out how the mobile object intersects with the ink and, based on the object's movement, how the object should deflect off of the ink to look realistic.

Figure 1:
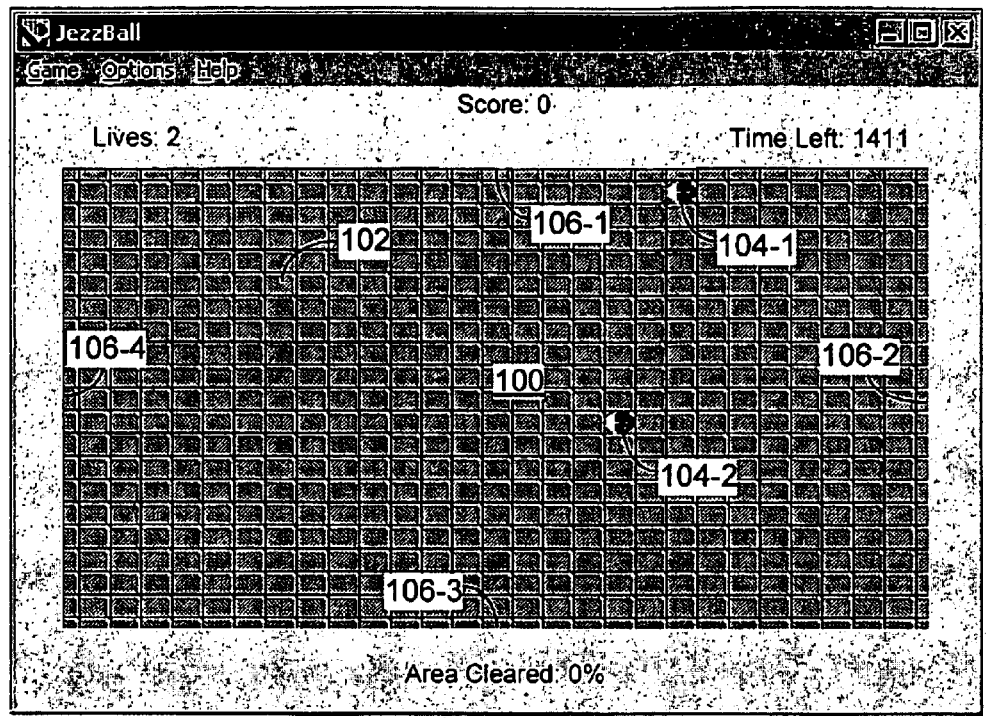
FIGS. 1–4 show a prior art computer game in which balls bounce off each other and off of flat horizontal and vertical walls.
Figure 2:
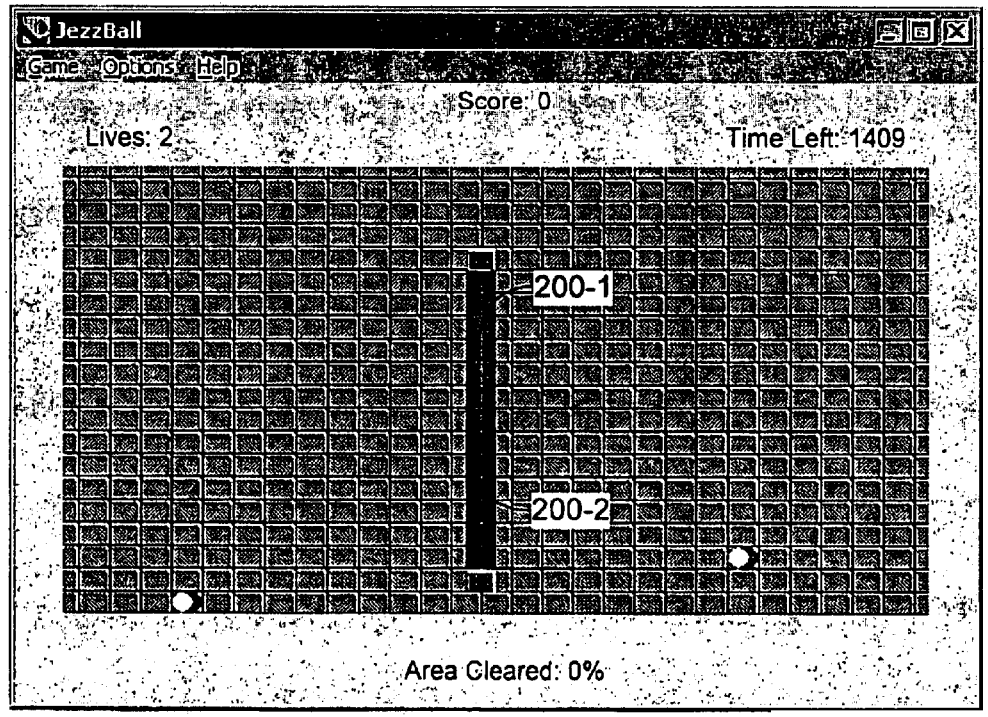
Figure 3:
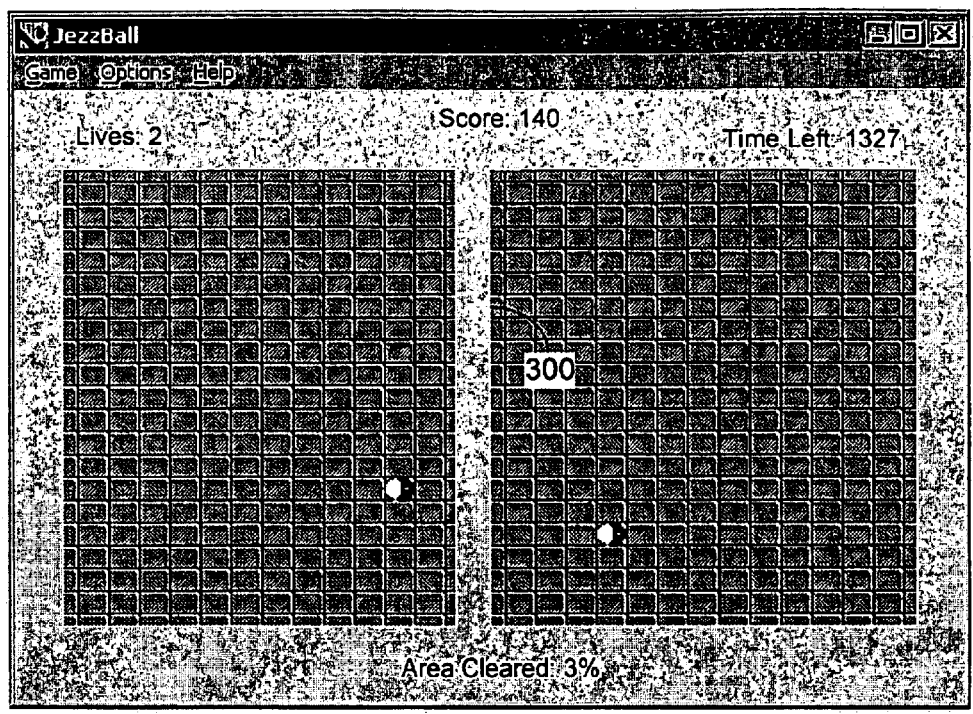
Figure 4:
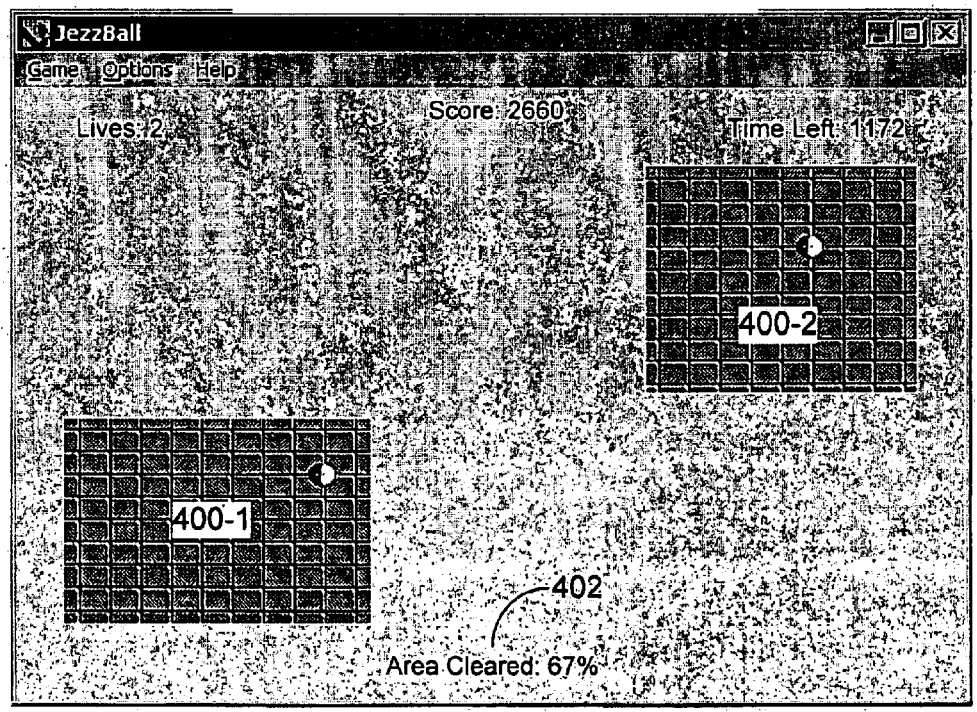
Figure 5:
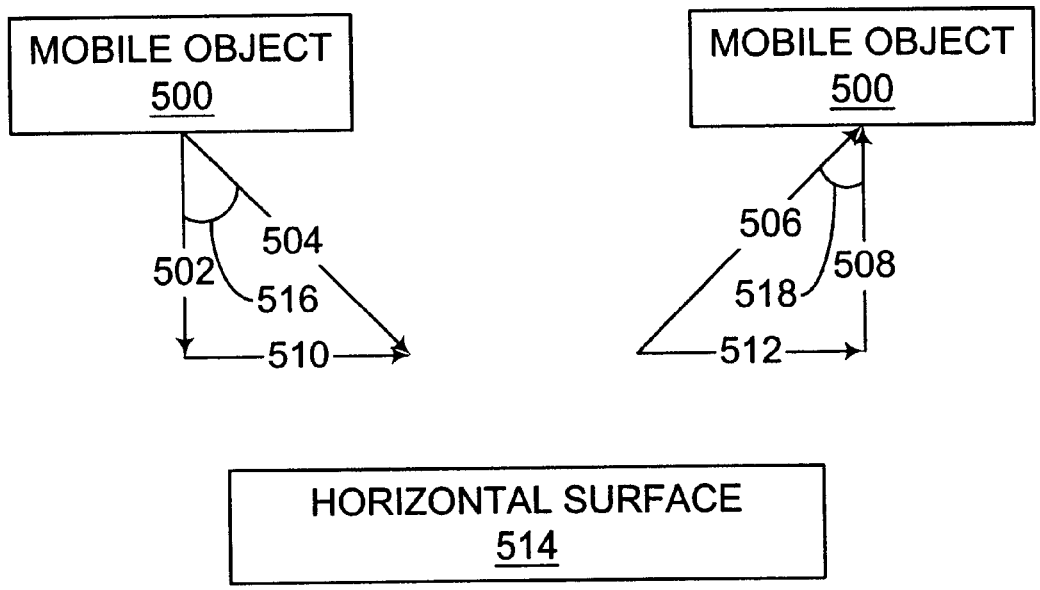
FIG. 5 shows velocity vectors for a mobile object before and after the mobile object has a conventionally processed collision with a horizontal surface.

With respect to the exemplary game discussed above in connection with FIGS. 8–11, the board manager 1208 retrieves and loads game boards. The different tile types 1204 can be represented as different objects. When a ball collides with a wall, for instance, the ball can ask the wall, how it should deflect. In response, the wall can tell the ball to deflect in a well-known manner, such as the manner discussed above in connection with FIG. 5. For example, a colored wall could tell the ball to deflect in such a manner and to change the color of the ball to the same color as the colored wall. Ball-collision processing is discussed in greater detail below. The tile types 1204 and/or the balls 1206 may be child objects of a game board managed by the board manager 1208.

User Interface components 1210 may include a player's score, a time limit for finishing a game board, a ball preview, which indicates what color ball will come out next, and the like. As balls move around the screen, the balls check to see whether they have collided with anything by calling into the collision-processing module 1202. Alternatively, the walls could call into the collision-processing module 1202 for detecting and processing collisions between balls and walls.

Figure 13:
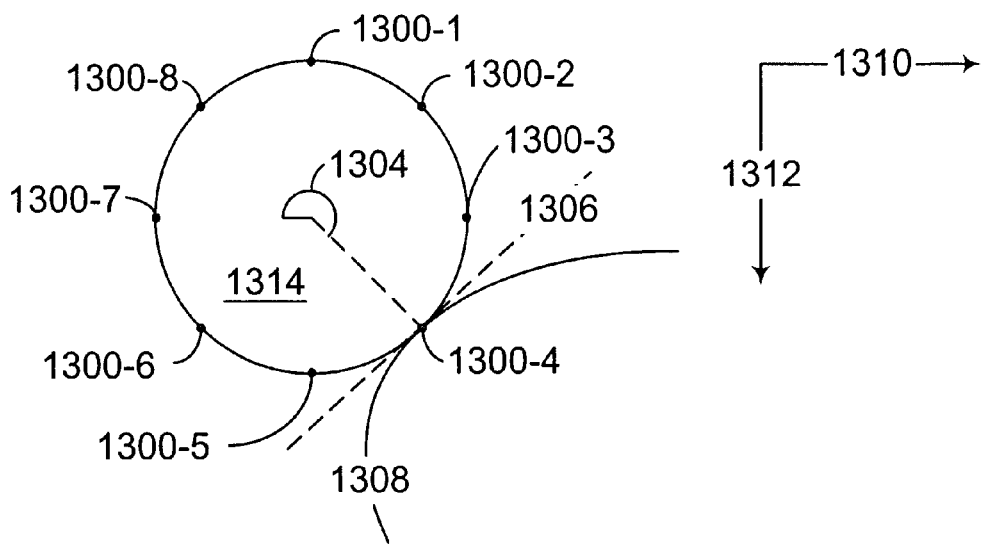
FIG. 13 shows collision of a single point along the periphery of a mobile object with electronic ink.
Figure 14:
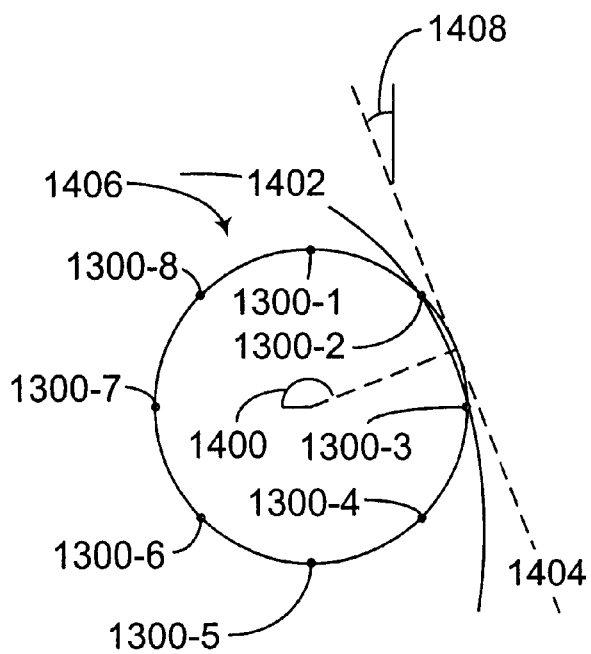
FIG. 14 shows collision of multiple points along the periphery of a mobile object with electronic ink.

Referring to FIGS. 13 and 14, the exemplary game uses ball points to simplify the process of determining an orientation of ink off which the ball should deflect. Exemplary ball points 1300-1 through 1300-8 are positioned around the periphery of balls 1314 and 1406. Although FIGS. 13 and 14 show eight ball points, any other suitable number of ball points, such as 32, may be used.

The application program 1200 asks the ink API 1212 whether a bounded shape at a particular location collides with any ink. If there is such a collision, and the ink is curved, determining how a mobile object should bounce off of the curved ink can be relatively complicated. For example, if the ink is concave-shaped, then determining how the mobile object should move after the collision can become much more complicated by the mobile object colliding with the ink at multiple collision points along the periphery of the mobile object.

Collision Processing

Determining an orientation of an ink surface off which the mobile object should deflect will now be discussed in the context of the exemplary game. But the concepts apply to other shapes and in other contexts. After calling the ink API to figure out whether there is a collision for a ball of a given size, a more detailed search is performed with the center of the ball being moved out to the perimeter and the radius being relatively small, such as one-tenth of a pixel, or any other suitable size. Using more ball points along the perimeter will provide more precision. FIG. 14 provides an example in which there are two intersecting ball points 1300-2 and 1300-3. An angle of collision 1400 can be determined by averaging the angles of the two ball points together.

Once the angle of collision is known, the angle at which the ball should leave the ink can be determined. This technique handles the situation in which multiple points collide with ink simultaneously. A data structure can maintain an x value, a y value, and an angle for each ball point, also referred to as each point along the periphery of the ball or mobile object. The x and y values may represent respective x and y coordinate difference values from the center of the circle to the point. For instance, if the radius of the ball 1314 shown in FIG. 13 is 5, then ball point 1300-7 could be assigned an angle of 0 and x and y difference values of –5, and 0. Ball point 1300-1 would have difference values of 0 and –5, and an angle of 90 degrees. Note that y coordinates start at 0 at the top of the screen and get larger as they move down the screen. By maintaining a data structure that stores these relative distances between a center point of the mobile object and the points along the periphery of the mobile object, techniques for determining an orientation of the ink surface of which the mobile object should deflect can be independent of the size of the mobile object.

Other conventions for assigning degree values to particular angles could also be used. For instance, 0 degrees can be defined elsewhere and/or negative angle values can also be used for some of the points along the periphery of the mobile object. As discussed in more detail below, once a collision angle is determined, then an orientation 1404 of an ink surface that is perpendicular to the collision angle, also referred to as the collision orientation, can be determined. To reduce the number of time-consuming sine and cosine functions performed, the application program may rotate the mobile object's velocity vector by an amount of rotation that, if applied to the collision orientation would make the collision orientation vertical, negate the object's x velocity vector, and rotate the velocity vector back the amount it was rotated. The mobile object will then move away from the ink as if the mobile object collided with ink oriented perpendicular to the collision angle.

Figure 15:
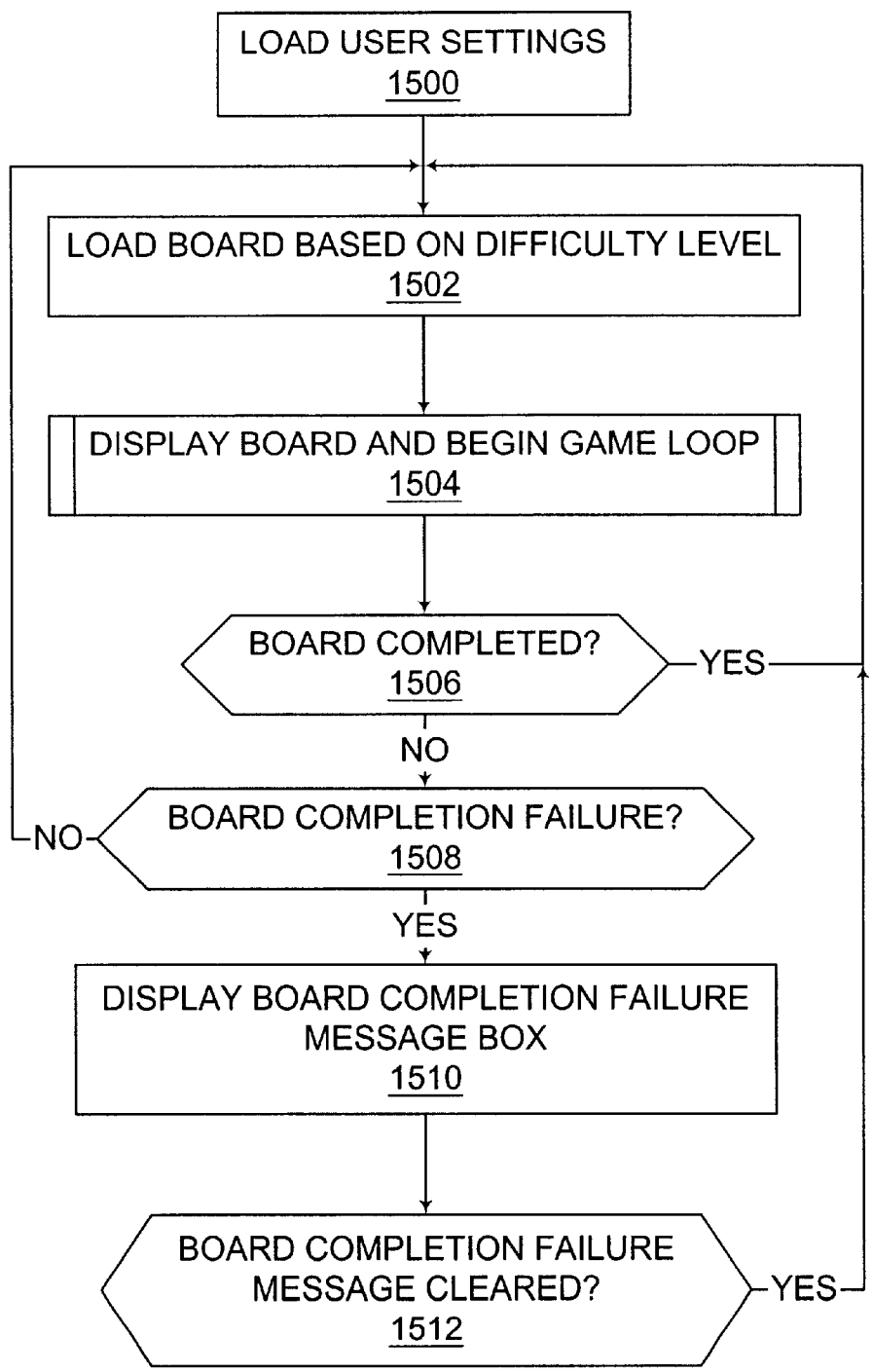
FIG. 15 is a high-level flow chart showing steps for providing a computer game in accordance with the invention.

FIG. 15 is a high-level flow chart showing steps for providing the exemplary game. User settings, such as the difficulty level, high score, and the like, are loaded, as shown at 1500. A game board is loaded, as shown at 1502, based on a difficulty level. The game board is displayed and the game loop begins as shown at 1504. The game loop is described in more detail below in connection with FIG. 16. A game board can end in two ways. The player can complete the game board. Then a new game board can be randomly selected and loaded based on difficulty level, as indicated with the yes branch from 1506. Or, a player can fail to complete the board by, for instance, putting a colored ball into a wrong-colored hole or by running out of time, as shown by following the yes branch from 1508. A game completion failure message box is then generated, as shown at 1510. After clearing the message box, the game will restart with a new ball, as shown by the yes branch from 1512. The loop may pause upon menu interaction where the user can change the difficulty level.

Figure 16:
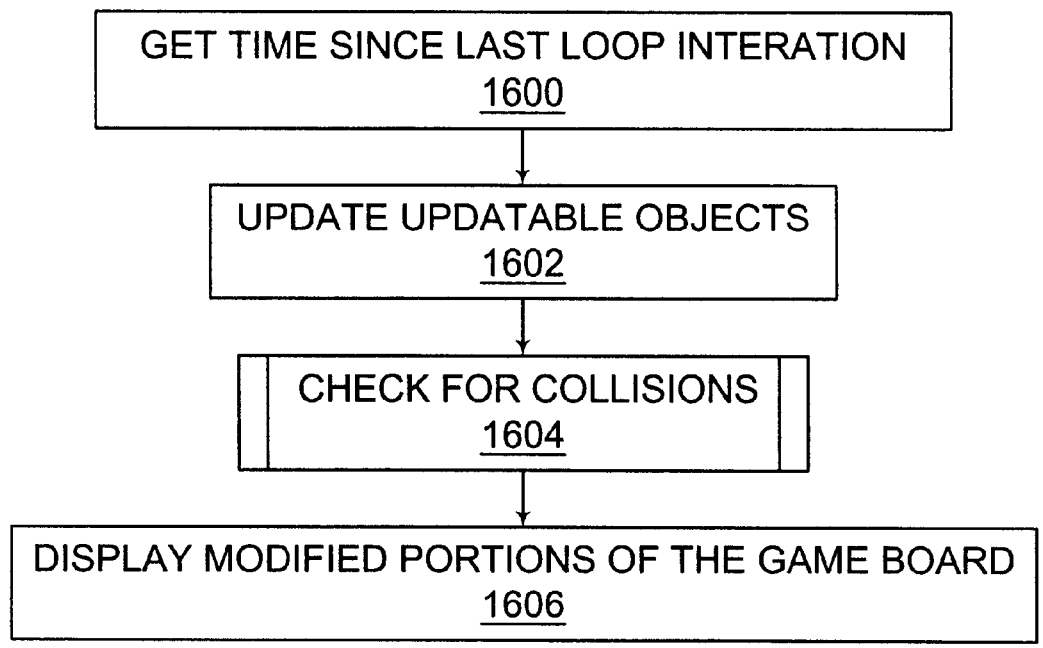
FIG. 16 is a more detailed flow chart of the game loop mentioned in FIG. 15.

The game loop referred to in step 1504 is shown in more detail in FIG. 16. Referring to FIG. 16, each time the game loop is executed, it may determine how much time has passed since the last game-loop iteration, as shown at 1600. Based on this information, the application program can account for situations in which the application program is not executed at precise intervals. Such situations can occur in a multitasking operating system having other applications running. Based on the amount of time elapsed since the last time the loop was run, a ball can determine how much it should move itself.

Updateable objects, which are things within the game that change over time, are updated, as shown at 1602. Updateable objects may include balls, tile types, and a game board timer.

The exemplary game then checks for collisions between the balls and ink, as shown at 1604. The balls can tell the board manager 1208 to check for collisions. A ball can pass information about itself, such as its location, to the board manager 1208, which can then check for collisions between balls and ink. As will be apparent, other suitable collision-checking techniques could also be used, such as having a separate game manager (not shown), or the balls themselves, check for collisions between the balls and ink.

After checking for collisions and updating ball trajectories, the game will re-display parts of the game board that have changed as depicted at 1606. Rather than redrawing the entire screen, the game redraws the rectangular portions of the screen that have changed.

The ink API 1212 may manage a separate thread for capturing, storing, and displaying ink entered by a user. The game may give the ink API permission to write to the game's video memory for displaying ink. The display screen gets updated each time the game loop runs. But the user can input ink with an input device at any time. So even though the screen may be updating only 20 times per second on a slow machine, the ink can be captured, stored, and displayed with a higher resolution.

Figure 17:
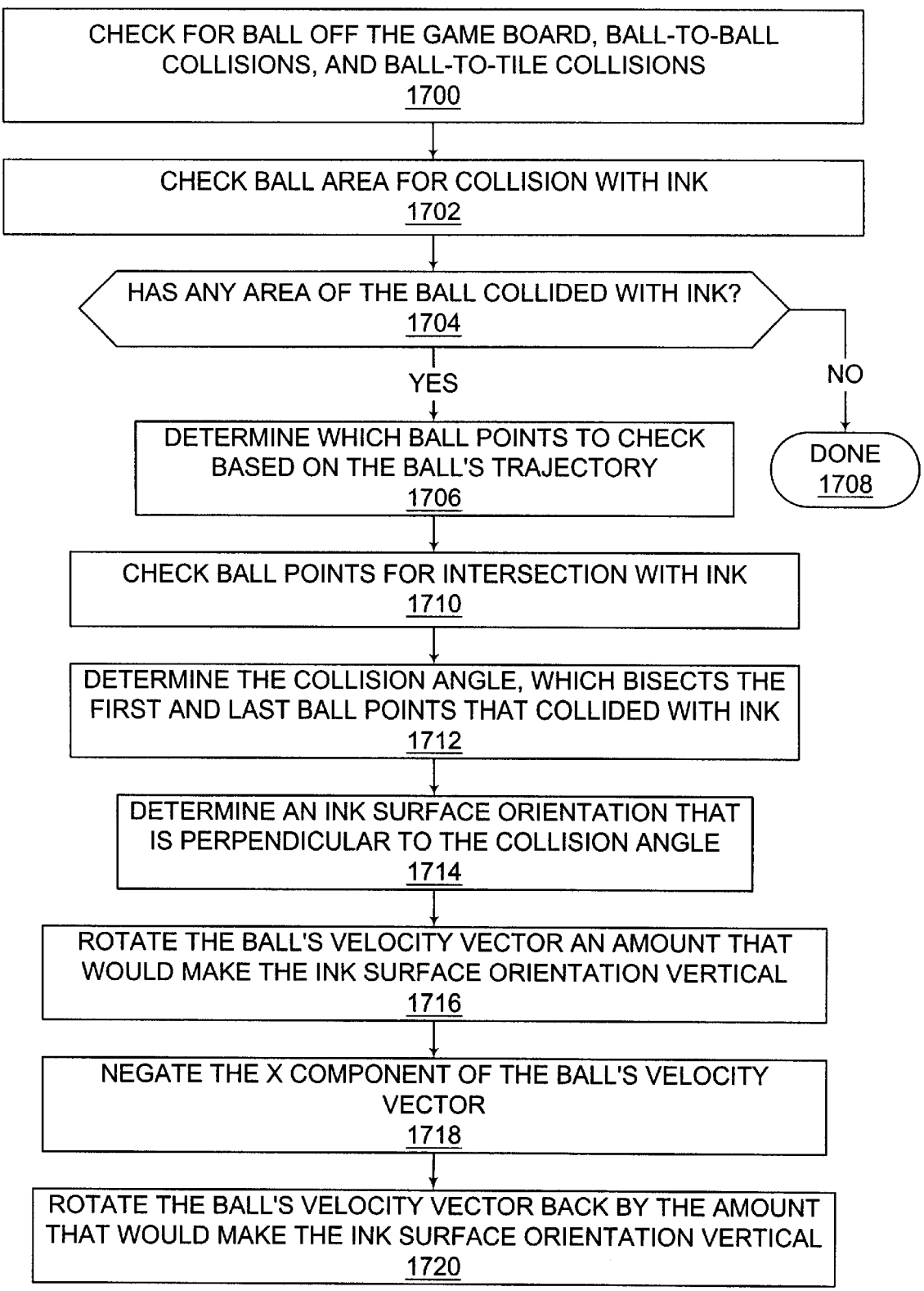
FIG. 17 is a more detailed flow chart of the collision-checking step of FIG. 16.

The collision-checking step 1604 is shown in more detail in FIG. 17. Whether the ball has gone off the board is checked at step 1700. Some boards may have walls drawn all the way around the edges. Other boards may not have walls all the way around the edges.

Step 1700 also includes checking for ball-to-ball collisions and ball-to-tile collisions. Techniques for processing ball-to-ball collisions are well known in the art. In the context of the exemplary game, if a first ball collides with a second ball, the first ball may update itself and the second ball's trajectory, and the second ball does not need to check for collisions with the first ball or update its own trajectory in response to the collision.

Ball-to-wall collisions can be handled in a manner that is well known in the art, including any manner similar to what was discussed above in connection with FIG. 5 for collisions with horizontal or vertical flat surfaces.

In step 1702, the ball's area is checked for any collisions with ink. If no collisions are detected, ball-to-ink collision processing is done for the ball for this iteration of the game loop, as depicted by 1708, at the end of the no branch from 1704.

If any area of the ball has collided with ink, then a determination is made as to which ball points should be checked in step 1706. The ball's trajectory can be used to select ball points along the perimeter of the ball that are most likely to have collided. For instance, based on the ball's trajectory, ball points along a semi-circle in the front of the ball can be checked and ball points in the back of the ball can be ignored. The front and the back of the ball may be defined relative to the ball's trajectory. So, with reference to FIG. 13, if the ball is moving horizontally from left to right, as depicted by arrow 1310, then ball points 1300-1 through 1300-5 could be checked. If the ball was moving down vertically, as depicted by arrow 1312, ball points 1300-3 through 1300-7 could be checked.

In step 1710, the ball points selected in step 1706 are checked for intersection with ink. Based on which of these selected ball points intersect with ink, a collision angle is determined. With reference to FIG. 13, intersection of a single ball point 1300-4 with the ink 1308 is detected. The collision angle, therefore, is determined to be angle 1304. As previously discussed, a data structure may be maintained that includes, for each ball point along the periphery of the ball, both location information and an associated angle relative to the ball's center point.

FIG. 14 depicts the case in which two ball points 1300-2 and 1300-3 intersect with concave-shaped ink 1402. Accordingly, the collision angle 1400 bisects the angles associated with the first intersecting ball point, 1300-2 and the last intersecting ball point 1300-3. By bisecting the angles associated with the first and last intersecting ball points, wherein the first and last intersecting angles may be the same, one or more intersecting ball points can be handled.

After determining the collision angle, an ink surface collision orientation, depicted at 1306 and 1404, is determined, as shown at 1714, by determining an angle that is perpendicular to the collision angle. This ink surface collision orientation is essentially a line that is tangent to the surface of the ball and perpendicular to the collision angle. For instance, ink surface collision orientations 1306 and 1404 are tangent to the surfaces of balls 1314 and 1406 and are perpendicular to collision angles 1304 and 1400. These ink surface collision orientations can be thought of as flat surfaces off which balls 1314 and 1406 should bounce to make collisions between the balls and the ink look realistic.

To avoid performing time-consuming trigonometric functions at run time, the ball's velocity vector may be rotated by an amount that, if applied to the ink surface collision orientation, would make the ink surface collision orientation vertical. An example of this amount of rotation is shown by angle 1408 in FIG. 14. Then, in a manner similar to that discussed above in connection with FIG. 5, the x or horizontal velocity component of the ball's velocity can be negated, as shown at 1718. In step 1720, the ball's velocity vector can then rotated by an inverse of the amount it was rotated in step 1716. The ink may expose a property, several of which were discussed in more detail above, that may change one or more properties of the ball after the collision. For example, the ball's velocity could be increased or decreased and/or the ball could change color based on the ink's color.

As will be apparent, in steps 1716, 1718, and 1720, the ball's velocity vector could be rotated by an amount that, if applied to the ink surface collision orientation, would make the ink surface collision orientation horizontal. Then, the y or vertical velocity component of the ball's velocity could be negated. The ball's velocity vector could then be rotated back. In another embodiment, steps 1716–1720 may be replaced with dot-product math or trigonometric calculations, both of which are well known in the art, for calculating a ball's exit angle from a collision. The dot-product-math approach advantageously eliminates execution of costly sine and cosine operations.

While the exemplary game has mobile balls, the techniques discussed above for determining a collision angle and an ink surface collision orientation could be applied to objects of other shapes, such as a hexagon, for which the location of points along the perimeter of the shape are known. For instance, instead of balls, the mobile objects could be cars, animals, or any other object having a randomly selected fixed shape. The user of an application program could generate shapes on the screen in any suitable way. The mobile objects could bounce off of windows and icons in the context of a screen saver application program.

While the invention has been described with respect to specific examples including presently preferred modes of carrying out the invention, those skilled in the art will appreciate that there are numerous variations and permutations of the above described systems and methods that fall within the spirit and scope of the invention as set forth in the appended claims.

We claim:

1. In a computer system, a method of processing a collision involving a first virtual object and a second virtual object, the method comprising:

determining which at least one point has collided with a free form shape of the second object, wherein the free-form shape is dynamically defined at run time;

based on the at least one point that has collided with the second object, determining a collision angle;

based on the collision angle, causing the first object to move away from the second object after the collision as if the first object collided with a collision surface that is perpendicular to the collision angle.

2. The method of claim 1, wherein the at least one point is along a periphery of the first object.

3. The method of claim 2, wherein determining which at least one point along the periphery of the first object has collided with the second object comprises:

selecting a subset of points along a front portion of the periphery of the first object, wherein the front portion is determined relative to the first object's trajectory; and checking for collisions between the subset of points and the second object.

4. The method of claim 2, wherein determining the collision angle comprises:

determining a first intersecting point along the periphery of the first object and a last intersecting point along the periphery of the first object; and setting the collision angle to be an angle that bisects the first intersecting point and the last intersecting point.

5. The method of claim 1, further comprising: determining a collision surface orientation that is perpendicular to the collision angle.

6. The method of claim 5, wherein causing the first object to move away from the second object after the collision comprises:

rotating the first object's velocity vector in a first direction by an amount that would make the collision surface orientation vertical;

negating an x component value of the first object's velocity vector; and rotating the first object's velocity vector in a direction opposite to the first direction by the amount that would make the collision orientation vertical.

7. The method of claim 5, wherein causing the first object to move away from the second object after the collision comprises:

rotating the first object's velocity vector in a first direction by an amount that would make the collision surface orientation horizontal;

negating a y component value of the first object's velocity vector; and rotating the first object's velocity vector in a direction opposite to the first direction by the amount that would make the collision orientation horizontal.

8. The method of claim 1, wherein the free form shape of the second object is dynamically defined at run time based on user input.

9. A computer-readable medium containing computer-executable instructions for processing a collision involving a digitally represented ball and electronic ink, wherein a free form shape of the ink is dynamically defined at run time, the method comprising:

determining which one or more points, along a circumference of the ball, have collided with the ink;

based on the one or more points that have collided with the ink, determining a collision angle; and based on the collision angle, causing the ball to move away from the ink after the collision as if the ball collided with ink oriented perpendicular to the collision angle.

10. The computer readable medium of claim 9, wherein determining which one or more points, along the ball's circumference, have collided with the ink comprises:

selecting a subset of points along a front portion of the ball's circumference, wherein the front portion is determined relative to the ball's trajectory; and checking for collisions between the subset of points and the ink.

11. The computer readable medium of claim 9, wherein determining the collision angle comprises:

determining a first intersecting point along the ball's circumference and a last intersecting point along the ball's circumference; and setting the collision angle to be an angle that bisects the first intersecting point and the last intersecting point.

12. The computer readable medium of claim 9, comprising further computer-executable instructions for determining an ink-collision orientation that is perpendicular to the collision angle.

13. The computer readable medium of claim 12, wherein causing the ball to move away from the ink after the collision comprises:
- rotating the ball's velocity vector by an amount that would make the ink-collision orientation vertical;
- negating an x component value of the ball's velocity vector; and
- rotating the ball's velocity vector by an inverse of the amount that would make the ink-collision orientation vertical.

14. The computer readable medium of 12, wherein causing the ball to move away from the ink after the collision comprises:
- rotating the ball's velocity vector in a first direction by an amount that would make the ink-collision orientation horizontal;
- negating a y component value of the ball's velocity vector; and
- rotating the ball's velocity vector by an inverse of the amount that would make the ink-collision orientation horizontal.

15. The computer readable medium of 9, wherein the free form shape of the ink is dynamically defined at run time based on a user's handwritten ink strokes.

16. An ink-based computer game comprising:
- colored balls;
- a plurality of game boards having tiles, wherein each tile can be a floor tile, a wall tile, or a drain; and
- free form handwritten electronic ink entered by a user while playing the game, wherein the balls bounce off of other balls, wall tiles, and the electronic ink and go through drainpipes in the game boards.

17. The ink-based computer game of claim 16, wherein a user scores points when a colored ball goes into a drain pipe that has a color that is the same as the ball's color and wherein a player of the game loses a life within the game when a colored ball goes into a drain pipe that has a color different than the ball's color.

18. The ink-based computer game of claim 16, wherein at least one of the game boards includes a transport tile that teleports a ball to another spot on a game board.

19. The ink-based computer game of claim 16, wherein balls change color when they collide with ink.

20. The ink-based computer game of claim 16, wherein colored ink changes the color of balls that collide with the colored ink.

21. The ink-based computer game of claim 16, wherein ink disappears when balls collide with the ink.

22. A computer system including an application program that uses an ink API, which provides services for capturing, storing, and displaying ink entered by a user, the system comprising:
- an input device for entering free form handwritten electronic ink; and
- an ink-based computer application program that includes a collision processing module that
  - requests information from the ink API about whether free form ink, entered by a user at run time of the application program, exists at locations occupied by one or more selected mobile application-program objects, and
  - causes a change to a trajectory of at least one of the selected mobile application-program objects, based on how the locations of the mobile application-program objects overlap with the free form ink.

23. The computer system of claim 22, wherein the application program gives the ink API permission to display ink on the application's video memory.

24. The computer system of claim 23, wherein the selected mobile application-program objects are balls and the collision module requests information from the ink API about whether ink exists at locations occupied by the balls by passing to the ink API data defining a circle via a center point and radius.

25. The computer system of claim 24, wherein, upon determining that a ball has collided with ink, the collision module requests information from the ink API about whether ink intersects with a plurality of ball points along a circumference of the ball.

26. The ink-based computer-game system of claim 25, wherein the collision module uses the information from the ink API about whether ink intersects with the plurality of ball points along the circumference of the ball to determine a collision angle.

27. The ink-based computer-game system of claim 26, wherein the collision module causes the ball to deflect as though the ball collided with an ink-collision surface oriented perpendicular to the collision angle.

* * * * *

UNITED STATES PATENT AND TRADEMARK OFFICE
CERTIFICATE OF CORRECTION

PATENT NO. : 6,722,987 B2
DATED : April 20, 2004
INVENTOR(S) : Lachlan Orr

It is certified that error appears in the above-identified patent and that said Letters Patent is hereby corrected as shown below:

<u>Column 13,</u>
Line 12, delete "12" and insert -- claim 12 --.
Line 23, delete "9" and insert -- claim 9 --.

Signed and Sealed this

Seventh Day of June, 2005

JON W. DUDAS
*Director of the United States Patent and Trademark Office*